May 14, 1940.  D. A. RUHL  2,200,654
COUPLING DEVICE
Filed March 27, 1939
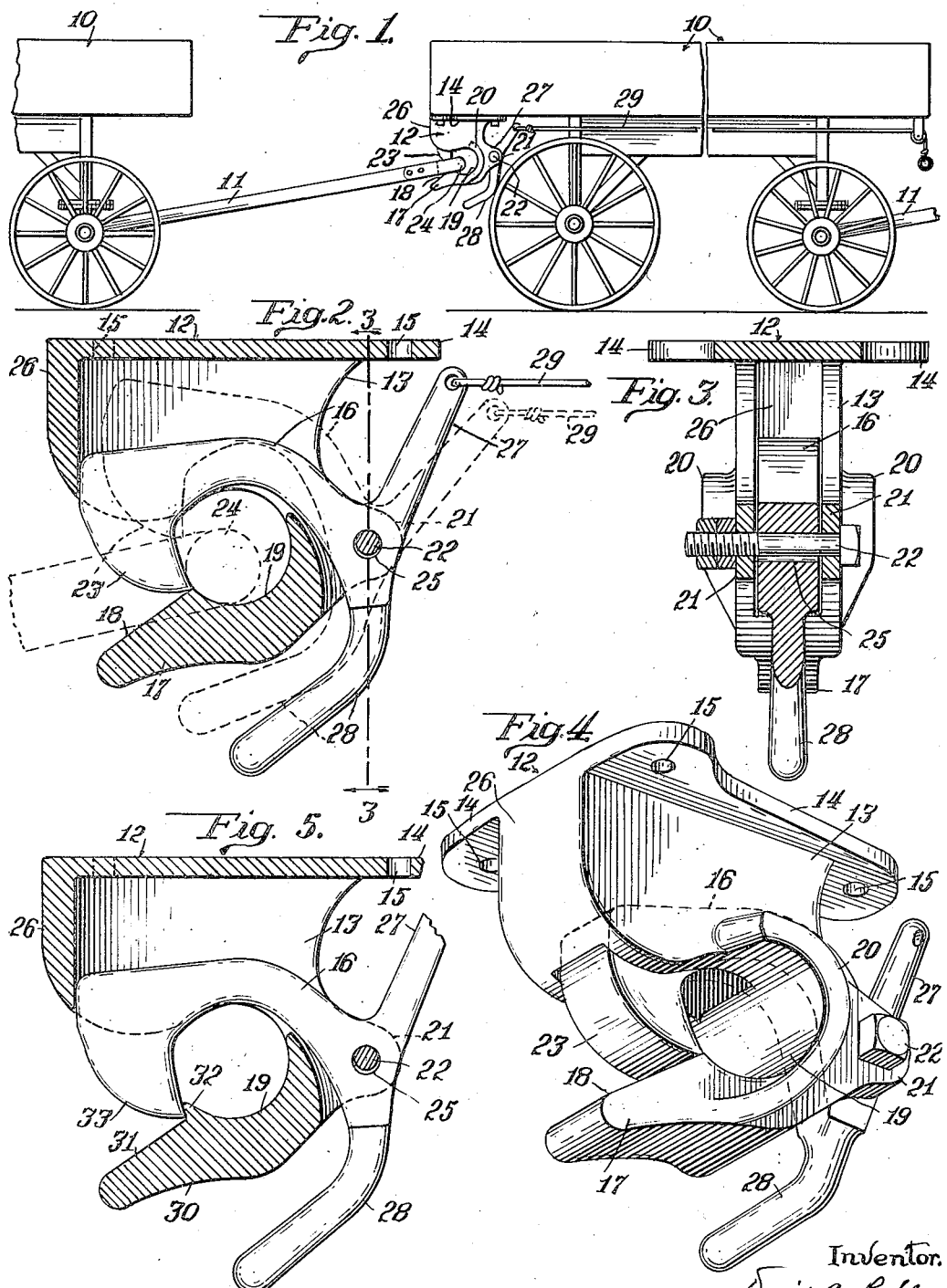
Inventor.
David A. Ruhl,
By George Heidman
Attorney.

Patented May 14, 1940

2,200,654

UNITED STATES PATENT OFFICE 2,200,654

COUPLING DEVICE

David A. Ruhl, Chicago, Ill.

Application March 27, 1939, Serial No. 264,375

4 Claims. (Cl. 280—33.15)

My invention relates to a coupler which is more especially intended for use with tractor-trailer combinations, namely with baggage trucks and mail trucks, to permit a tractor and one or more of the baggage or mail trucks to be coupled together.

The invention has for its object the provision of a coupling device which is adapted to receive the usual hand-ring or bail attached to the front end of a truck or to the pull tongue or shaft of a truck and which automatically will effect coupling engagement with the bail.

A further object of the invention is to provide a coupler which will permit a train of any number of trucks to be readily released or uncoupled without requiring slack in the coupled relation; the improved coupling device being of such construction that a remote release or uncoupling may be effected when desired.

Another object of the invention is the provision of a coupling device which may be readily attached to a tractor and to the rear ends of the usual baggage or mail trucks at present in use without necessitating alteration in their construction and without interfering with the manual operation of the trucks when occasion requires; namely a construction wherein the strains are transmitted to the non-movable part of the main casting or body of the coupler device.

The above enumerated objects, as well as others, and the advantages inherent in the invention will all be readily comprehended from the following detailed description of the accompanying drawing wherein:

Figure 1 is a side elevation of portions of a pair of coupled trucks provided with my improved coupling device.

Figure 2 is a vertical sectional view of the coupling device with a ring or bail in section and the device in coupling position.

Figure 3 is a vertical sectional view taken substantially on the line 3—3 of Figure 2, looking in the direction of the arrows.

Figure 4 is a perspective view of my improved coupling device.

Figure 5 is a view similar to Figure 2, illustrating a modification.

My improved coupling device, as previously stated, is more especially adapted for coupling together one or more baggage or mail trucks and for coupling the coupled trucks or a single truck to a tractor of the type more generally employed in railroad passenger stations; and for purposes of exemplification I have shown in Figure 1 portions of two trucks at 10, 10 with the bail at the outer end of the tongue or shaft 11 shown held by the coupling device indicated at 12 which is secured to the rear end of the preceding truck or the tractor, as the case may be; it being understood that a coupling device, in addition to being applied to the rear end of a tractor may also be applied to the rear ends of the trucks to enable one or a number of units to be coupled together.

The specific embodiment of the coupler device comprises a main casting or body 13 having laterally disposed flanges 14, 14 at the top, apertured at 15 to receive suitable bolts or other fastening means whereby the device may be secured to the bottom of the tractor and truck platform.

The body 13 in its upper part is slotted from the end wall shown in Figures 2 and 4 to the opposite end to receive the main portion of the movable jaw or latch member 16, later to be described; while the lower ends of the side walls 13 of the body or casting unite beneath the slot to form the rearwardly and downwardly curved portion or prong which constitutes the tapered immovable or stationary jaw 17.

The jaw 17 is provided with an upwardly sloping surface 18 which leads to a bail or ring receiving arcuate socket 19 and terminates slightly above the bottom of the socket as shown; while the depending jaw and socket portion of the body are preferably reenforced on opposite sides by the arcuate ribs as at 20.

The slotted or bifurcated portion of the body 13 is provided with spaced apart lobes or ears 21, which are apertured to receive the pivot pin or bolt 22 whereby the movable latch member or jaw 16 is secured in place.

The movable jaw or latch member 16, whose main portion normally extends in a substantially horizontal direction rearwardly of the pivot point 22, terminates at one end in a downwardly curved hook-like portion 23, the tip whereof contacts the upwardly sloping face 18 of the immovable or stationary jaw 17, preferably adjacent the crown or top of said jaw 17. The curved latch member 16 and the curved wall of the casting circumscribe the substantially annular bail receiving socket 19, with the contact between the movable jaw 16 and the immovable jaw 17 disposed slightly beneath the horizontal plane of the pivot point 22.

The outer face of the movable jaw or latch member 16 is also provided with a slope or curvature disposed toward the crown or apex of member 17, in order that the protruding ring or bail at the end of an adjacent truck will be guided by the curved or sloping surfaces toward the juxtaposed tips of the two jaw members and cause the tip of the movable jaw member 16 to move upwardly away from the stationary jaw 17 and allow the bail, indicated at 24 see Figure 2, to enter the socket 19, at which time movable jaw or latch member 16 will immediately drop down into its normal coupling position shown in Figures 2 and 4 by reason of the weight of the main portion of the latch member being arranged rearward of the pivot pin 22 which extends through opening 25 in the opposite end of jaw member 16.

As shown in Figures 2 and 4, the outer vertically disposed end wall 26 of the coupler or casting terminates in close proximity to the curved outer end of the movable latch member or jaw 16 and permits free oscillatory movement of the latch or jaw member 16. The pivot pin receiving opening 25 in latch or jaw member 16 is preferably made slightly larger than the diameter of the pivot pin or bolt 22, see Figures 2 and 3, in order to permit movable latch member 16 to move into contact with the end wall 26 of the main body or casting when it is subjected to the pulling action of the ring or bail 24 of the coupled rearward truck and thereby transmit the pulling strains to the main casting and relieve the pivot pin 22 from load pulling strains.

The forward or pivoted end of the latch member or movable jaw 16 is provided with an upwardly disposed arm 27 and a depending and slightly rearwardly bent arm 28, which extend, respectively, above and beneath the pivotal point of the latch member and preferably to opposite sides of the vertical plane of the pivot and thereby somewhat counterbalance each other so as not to affect the gravity controlled action of the main portion of the latch member.

The upwardly disposed arm 27 is shown apertured at its end to receive a cable or wire, as at 29, which may lead forwardly to the tractor and thus enable the operator to move the latch member or jaw 16 to open or uncoupling position, namely to tilt the free or hook-end of the latch member upwardly into the slot between the bifurcations or side walls 13 of the casting, as shown in dotted lines in Figure 2.

The arm 28 provides means for manual control or operation, independent of the remote control afforded by arm 27 and cable or wire 29.

With the jaws constructed as shown, it is apparent that the pulling strains will be exerted mainly on the immovable jaw member 17 and that portion of the pull which is encountered by the movable jaw 16 will be transmitted to the main casting by reason of the jaw 16 shifting into contact with the end wall 26; the construction and relation between the jaw members and the pivot point being such that accidental movement of the latch member to uncoupling position will not occur; while any forward thrusts of the bail will be taken care of by the curved body wall defining the bail receiving socket; the coupling device being adapted to effect coupling engagement with the hand-grasping rings or bails arranged on baggage or mail trucks as at present in use without necessitating alteration or change in present day construction.

In Figure 5 a slightly modified form of the coupler is shown in so far as the stationary jaw portion 30 is concerned. The jaw 30, which is substantially similar to jaw 17, is somewhat reduced in vertical thickness from the lower side to the sloping surface 31; and the crown or apex of the sloping surface extends slightly above the main portion of the surface 31 to form a lip 32. By cutting back or reducing the vertical thickness of the jaw, a more shallow bail or ring receiving arcuate socket 19 is provided.

The latch member 16, as in the previously described exemplification, is pivoted to swing upwardly into the slot or recess formed in the upper part of the main body 13, while the tip of the hook portion 33 is arranged to extend outwardly of the lip 32, with the result that the meeting point or juncture between the tip of the latch member and the stationary jaw member is not presented to the pulling strains of the bail or ring of the coupled truck and consequently any possibility of the bail passing between the tips of the jaw members is entirely eliminated. The gradual sloping or curved wall of the bail receiving socket, however, induces the bail to slip off the small lip 32 readily, because in practice the position of the bails on trucks as at present employed is such that the bail of the coupled truck normally contacts the stationary jaw and the latch member as is the case in the previously described structure.

The coupling devices on both sides are preferably formed with the laterally disposed arcuate ribs 20 arranged to extend around the forward side of the bail receiving socket in order to provide a comparatively wide surface which prevents the bail of a coupled truck becoming wedged in the socket when a train of coupled tractor and trucks is making a sharp turn in its travel.

As is apparent from the drawing, the latch member 16, except for the depending hook end, is located entirely within the slot or recess of the main body of the coupler and consequently the main portion of the latch member cannot be subjected to any forcible upward thrusts by the rigidly held ring or bail of an onrushing truck.

The exemplifications shown are believed to be the best embodiments of the invention and have been described in terms employed for purposes of description and not as terms of limitation, as structural modifications may be possible without, however, departing from the spirit of my invention as defined in the appended claims.

What I claim is:

1. A coupling device of the character described comprising a hollow main body open at the bottom and at the inner end, said end of the main body having a downward projection curving toward the opposite closed end of the main body and spaced beneath the open bottom of said body, the bottom of said body and its curving projection defining a bail or ring receiving socket adapted to take the pushing thrusts of a coupled vehicle, said projection terminating in an upwardly inclining immovable jaw adapted to receive the pulling strains; a gravity actuated jaw member arranged in said recess and pivotally connected at one end to said main body adjacent said projection to swing upwardly within the recess, while the free end of said jaw member curves downwardly through the open bottom of said recess into contact with the upper part of the inclining immovable jaw, the pivotal relation between said gravity actuated jaw member and the main body being such that the movable jaw member will move into contact with the end wall of the main body when subjected to pulling strains; and means associated with the pivoted end of said gravity actuated jaw member for tilting the latter upwardly into uncoupling position.

2. A coupling device of the character described comprising a main body provided in its upper part with a lengthwisely disposed slot terminating adjacent one end wall of the body and open at one end and at the bottom, the open end of the body having a downwardly extending projection sloping toward the closed end of the body in spaced relation beneath the open bottom of the slotted portion to define a bail or ring receiving socket, the end of the projection having a sloping surface extending slightly above the bottom of the socket, said projection being provided with laterally disposed spaced apart apertured lobes; a gravity controlled latch member arranged lengthwisely within said slot and adapted to be pivotally connected at one end to swing upwardly within the slot while the free end is disposed in juxtaposition to the end wall of said slot and extends downwardly through the open bottom of said slot into proximity with the top of the sloping surface of said projection, the outer surface of said free end of the member being formed to slope toward the top of the sloping surface of said projection to combinedly guide the bail or ring into the socket; a pivot element disposed through the latch member and said spaced lobes, with the relation between said element and the member being such that pulling strains on the latch member causes the latter to move into contact with the end wall of the recess and transmit all pulling strains to the body; and means secured to the pivoted end of the latch member whereby the latter may be tilted upwardly into uncoupling position.

3. A coupling device of the character described comprising a main body recessed in its upper part and said recess being open at the bottom and at one end of the main body and said end of the body being extended downwardly and curving beneath the upper recessed part of the main body toward the opposite end of the body, thence upwardly and spaced beneath the recessed part to constitute an immovable jaw provided with a sloping outer face; and a gravity actuated movable jaw member disposed lengthwisely within the recess of the main body and pivotally connected at one end at the open end of said main body to swing upwardly into the recess of the main body while the free end of said member curves downwardly through the open bottom of the recess into contact with the upper end of said sloping face of the immovable jaw, the free end of said movable jaw member being adapted to transmit pulling strains to the end wall of the main body; the main body with its downwardly projecting curved end and the downwardly curved end of the movable jaw member combinedly circumscribing a bail receiving socket whose one side wall is formed by the downwardly curving end of the main body and adapted to receive the forward thrusts of the coupled member; the pivoted end of the movable jaw member being provided with means whereby the jaw member may be tilted upwardly within said recess into uncoupling position.

4. A coupling device of the character described comprising a hollow main body adapted to be vertically disposed and open at the bottom and at one end, said end of the body at its bottom having an extension curving downwardly toward the opposite end of the body in spaced relation with the bottom of the main body and curving upwardly to provide a socket, the body and its depending projection being so formed that all forward and upward thrusts will be received by the main body; and a gravity controlled jaw member disposed lengthwise in said hollow main body and pivotally connected at one end to the main body adjacent said extension so as to permit said jaw member to shift into contact with the end wall of the main body and transmit the pulling strains encountered by said jaw member to the main body, while the free end extends downwardly through the bottom of said main body and into contact with the crown of the upwardly curved portion of said extension, the pivoted end of the jaw member being provided with a vertically disposed extension whereby the latch member may be tilted upwardly into uncoupling position.

DAVID A. RUHL.